(12) United States Patent
Shiu

(10) Patent No.: US 6,925,632 B2
(45) Date of Patent: Aug. 2, 2005

(54) SYSTEM FOR CONFIGURATION PROGRAMMING

(76) Inventor: Martin Shiu, 123 Ridge Ave., Newton Center, MA (US) 02459

( * ) Notice: Subject to any disclaimer, the term of this patent is extended or adjusted under 35 U.S.C. 154(b) by 449 days.

(21) Appl. No.: 10/003,737

(22) Filed: Nov. 2, 2001

(65) Prior Publication Data

US 2002/0129330 A1 Sep. 12, 2002

Related U.S. Application Data

(60) Provisional application No. 60/274,333, filed on Mar. 8, 2001.

(51) Int. Cl.⁷ ................................................. G06F 9/44
(52) U.S. Cl. ...................... 717/121; 717/104; 717/106; 717/108; 717/116
(58) Field of Search ............................... 717/100–104, 717/101, 106–108, 109, 116, 121; 718/107; 707/103 R, 103 Y, 2

(56) References Cited

U.S. PATENT DOCUMENTS

| 5,325,533 | A | * | 6/1994 | McInerney et al. ......... 717/107 |
| 5,421,012 | A | * | 5/1995 | Khoyi et al. ................ 718/107 |
| 5,787,283 | A | * | 7/1998 | Chin et al. .................. 717/101 |
| 5,889,992 | A | * | 3/1999 | Koerber ...................... 717/108 |
| 5,920,718 | A | * | 7/1999 | Uczekaj et al. ............. 717/109 |
| 5,960,200 | A | * | 9/1999 | Eager et al. ................. 717/147 |
| 5,970,498 | A | * | 10/1999 | Duffield et al. .......... 707/104.1 |
| 5,995,753 | A | * | 11/1999 | Walker ........................ 717/108 |
| 6,104,874 | A | * | 8/2000 | Branson et al. ............. 717/108 |
| 6,106,569 | A | * | 8/2000 | Bohrer et al. ............... 717/100 |
| 6,272,672 | B1 | * | 8/2001 | Conway ...................... 717/107 |
| 6,427,230 | B1 | * | 7/2002 | Goiffon et al. ............. 717/108 |
| 6,463,442 | B1 | * | 10/2002 | Bent et al. .............. 707/103 R |
| 6,513,030 | B2 | * | 1/2003 | Ellsworth et al. .............. 707/2 |
| 6,631,513 | B1 | * | 10/2003 | Gil et al. .................... 717/116 |
| 6,701,513 | B1 | * | 3/2004 | Bailey ........................ 717/109 |

OTHER PUBLICATIONS

TITLE: O2, an Object–Oriented Data Model, author: Lecluse et al, ACM, 1988.*
TITLE: An Object–Oriented Approach to database system implementation, author: Baroody et al, ACM, 1981.*

* cited by examiner

Primary Examiner—Chameli C. Das
(74) Attorney, Agent, or Firm—Law Office of Brett N. Dorny

(57) ABSTRACT

In a development platform, a classifier for a given application defines a data model of an application model as a pattern (an object model) from a finite number of patterns (object models) that represent the possible permutations of data models. In addition, the development platform has a finite number of service objects that perform various functions/services on the object model from which the application model adopts one or more service objects. The object models and the service objects are generic to the development platform and usually a set of finite number of object models and a set of finite number of service objects can interface the application model with the various third party resources and tools.

10 Claims, 5 Drawing Sheets

SYSTEM FOR CONFIGURATION PROGRAMMING

This application claims priority to U.S. Provisional Application Ser. No. 60/274,333 filed Mar. 8, 2001.

BACKGROUND OF THE INVENTION

1. Field of the Invention

The invention relates to application software and systems for creating software applications. More particularly, it relates to a data model oriented system, which allows rapid creation of software applications based upon modules for handling a finite set of data patterns.

2. Discussion of the Related Art

Generally, systems for creating software applications require extensive time from highly experienced programmers. Each part or feature of a software application has to be designed, coded, compiled, and debugged. Then, the parts have to be tested to ensure that they operate together. Since most applications included may different parts, the procedure is very complex. Many applications also need to operate with existing third party resources and tools. In creating a software application, interfaces must be created for each third party resource or tool. Furthermore, a software application is dependent upon a specific platform or operating environment. In order to transfer the application to another platform requires complete reprogramming.

FIG. 1 illustrates a traditional approach to application programming which incorporates specific programming with third party resources and tools 130. Tools and resources 130 may include other programs, communication capabilities and/or specific hardware to be utilized with the application. Typically, application programming is functionality driven. The programmer seeks to create certain functions to be performed by the application. The functions depend upon the hardware and software resources which are to be utilized by the application. In this regard, the application is platform dependent because it is developed for a specific programming environment. The functions then need to be coordinated with the data of the application. The coordination is typically done by creating and initializing specific data structures within the programming of the application.

FIG. 1 illustrates a data centric understanding of traditional application programming. In this known system 100, the data to be created, modified or utilized by the application is represented as various application data models 110. The functionality of the application requires a set of interfaces 120 between the application data models 110 and resources and tools 130 that provide the functionality. For example, database interface programming is required to interface with each database; Graphic User Interface (GUI) programming is required to interface with each GUI; transport interface programming is required to interface with each transport tool; and so forth. The resources and tools 130 utilized in the application come in various forms and choices and require the interface programming 120 to be specific to those forms or choices. For example, in choosing a transport, the application model may use one or more popular transport tools such as Java Messaging Service (JMS), e-mail, fax, and File Transfer Protocol (FTP). Each transport tool has a specific Application Program Interface (API). Furthermore, the interface programming 120 needs to be specific to the application data models 110. Thus, if changes are made to the application data models 110, then corresponding changes are required for all of the interface programming 120 for that application. Since the data definitions are part of the application code, any changes have to be made with lines of code, which must be compiled and debugged before it can be used. Also, additional programming is required to convert data in an old format to a new format required by the changed application program.

A programmer usually needs to understand the operating and programming environment of the resources and tools to interface with them. This typically requires a highly specialized and skilled programmer(s) to perform the various tasks of programming. Highly skilled programmers are difficult to train and retain. In addition, the various but disparate programs need to operate homogeneously for the application model to operate smoothly with the various resources and tools. However, such integration is difficult to achieve and exemplifies the development complexity of interfacing one or more application models to the various resources and tools.

Therefore, a need exists for a data independent, application programming system which does not require reprogramming based upon data changes. A need exists for a system which simplifies the programming process to allow reuse of previously created code. A need further exists for a system which is platform independent. A need exists for a system which allows common interfaces with third party resources.

SUMMARY OF THE INVENTION

The deficiencies of the prior art are substantially overcome by the present invention which provides a data model based system for programming. The system of the present invention is based upon a fixed set of data patterns or objects: primitive, class and object array. The data patterns can also be recursively defined. A set of service modules is created for performing various functions with respect to different data patterns. The service modules are organized to provide program flow from one module to another. In order to create an application within the system of the present invention, a data model is created which represents all of the data of the application as corresponding data patterns. The service modules are then selected and organized to provide desired functionality in conjunction with the data model. In this manner, applications can be created quickly from pre-existing modules.

Furthermore, in the system of the present invention, the modules provide the interaction between data and resources. In this manner, the application is resource independent. A change in a resource, such as a hardware platform, merely requires selection of an appropriate module for interfacing with that resource. The system of the present invention further uses a hierarchical approach for organizing modules to allow enhanced use for rapid software creation. Thus, many functions can be performed without limitations from the specific resources of the system.

BRIEF DESCRIPTION OF THE DRAWINGS

For better understanding of the invention, reference is made to the drawings which are incorporated herein by reference and in which.

DETAILED DESCRIPTION OF THE PREFERRED EMBODIMENT

Figure 1:
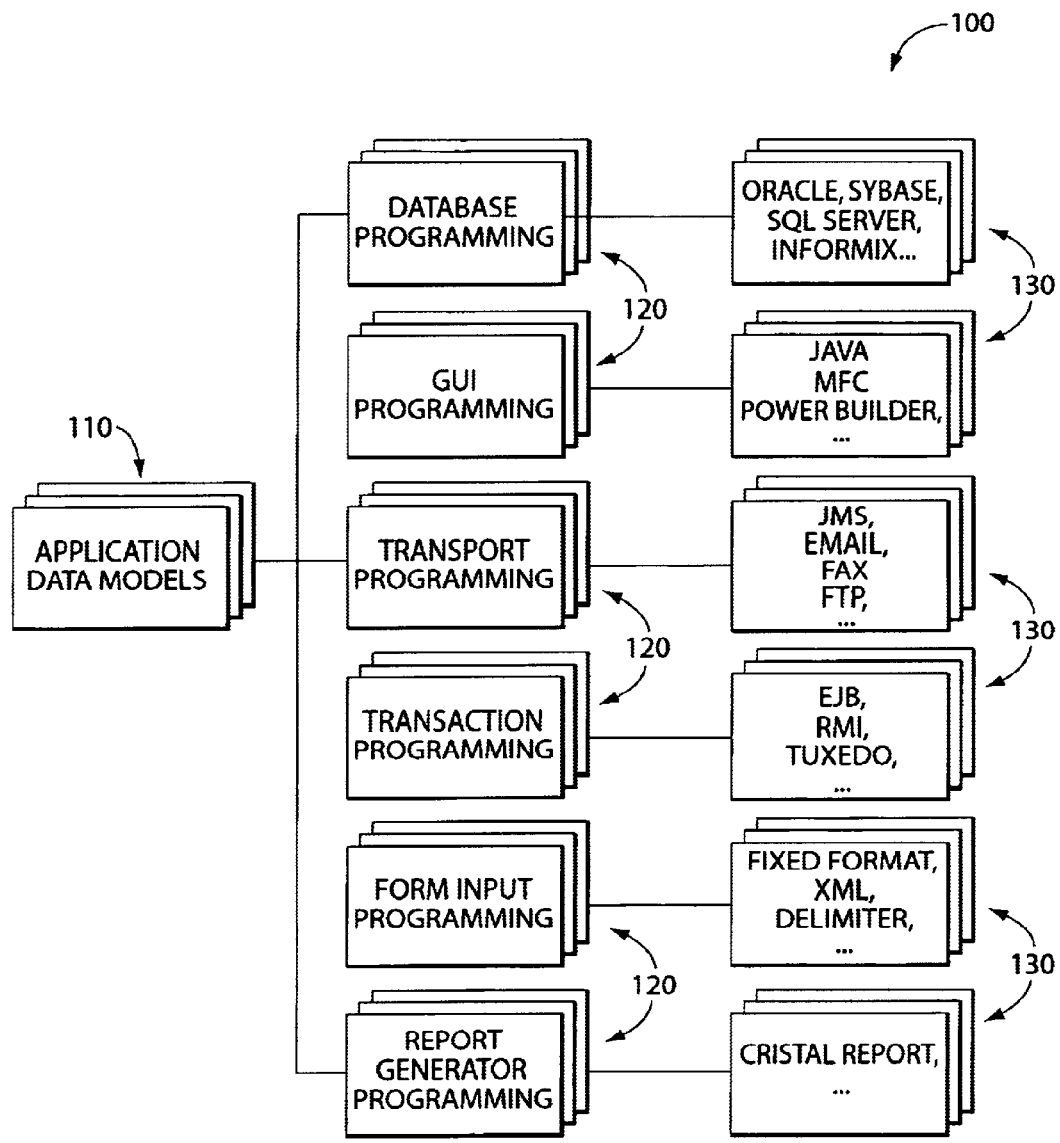
FIG. 1 is a schematic diagram illustrating a conventional approach to interfacing application models having data models to various third party resources and tools.

The present invention is a data-oriented system for rapid creation of application programs. The system is based upon the principle that all data can be modeled by a finite set of data patterns. Stored service object modules provide desired functionality based upon the known data patterns. The service objects maintain the interfaces to desired resources and provide a unified interface. In order to create an application in accordance with the present invention, the creator only needs to create a data model of the application data based upon the finite set of data patterns, select appropriate service object modules for providing desired functionality, and determine the flow or order of operation of the service objects. If specific functionality is required beyond that provided by exiting service object, new service objects can be created. The new service objects become part of the system and can be utilized for future programming.

In general, the components that comprise an application program according to the present invention are:
  a data model;
  service objects defining functions to be performed on the object models of the data model; and
  flow logic linking the service objects and object models to perform utility functions (or business functions).

The data model describes data structures representing the application data based upon basic data patterns. The service objects, which are software components, provide the functional or business processes of the application. These software components are linked into a flow to invoke services and/or to operate on the data and interface with resources. The manner in which the software components are linked is the flow logic of the application model. Results of the functional or business processes performed on the data model can be presented in a form compatible to a physical device (such as a computer monitor or a printer) or in a form compatible to an application software in memory. The components and operation of an application program according to the present invention can be better understood in relation to the process for creating the application program.

In a development platform of the present invention, a classifier defines a data model as a specific set of object models corresponding to application data based upon a finite number of basic data patterns. The object models define all application data within the limitations of the basic data patterns. Furthermore, the object models can be defined recursively to create complex data structures using the basic data patterns. In addition, the development platform has a set of selectable service objects that perform various functions/services on object models. At run time, the service objects recognize the basic data patterns within an object model and selectively operate in accordance with the defined the basic data patterns. Since the operation of the service objects is independent of the application data, changes in application data does not require changes to the service objects. The service objects usually represent functions/services that provide for the interfacing with the various third party resources and tools. The bridge between the development platform and the Application Programming Interfaces (APIs) of the third party resources and tools can be performed by storing and implementing service objects that are compatible with the third party APIs and are also compatible with the defined object model of the data model.

Figure 2:
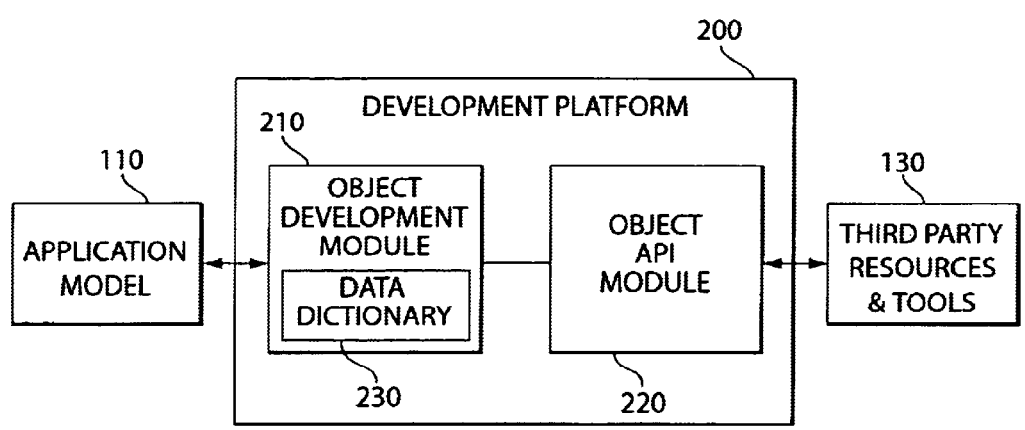
FIG. 2 is a schematic diagram of a development platform for application creation in accordance with an embodiment of the invention.

FIG. 2 illustrates a development platform 200 according to an embodiment of the present invention. The development platform 200 can be used to create application software in accordance with an embodiment of the present invention. As shown in FIG. 2, the development platform 200 has two principal components, an object development module 210 and an object application programs interface (API) module 220. The development platform 200 may be implemented as software/firmware embedded in a processor executable medium such as Read Only Memory (ROM), Random Access Memory (RAM), Flash memory, magnetic and optical disk and disk drives and the like. The development platform 200 may also be implemented in hardware such as application specific integrated circuit (ASIC) and the like. The processor executable medium also includes carrier signals containing processor executable instructions therein.

The object development module 210 translates the data of an application model 110 in a manner that is generic to the development platform 200. In particular, the data model of the application model is defined as a set of object models based upon basic data patterns. The classification method will be described with reference to FIG. 3. This allows various functions of the object API module 220 to be applied to the object models based on the basic patterns.

Figure 3:
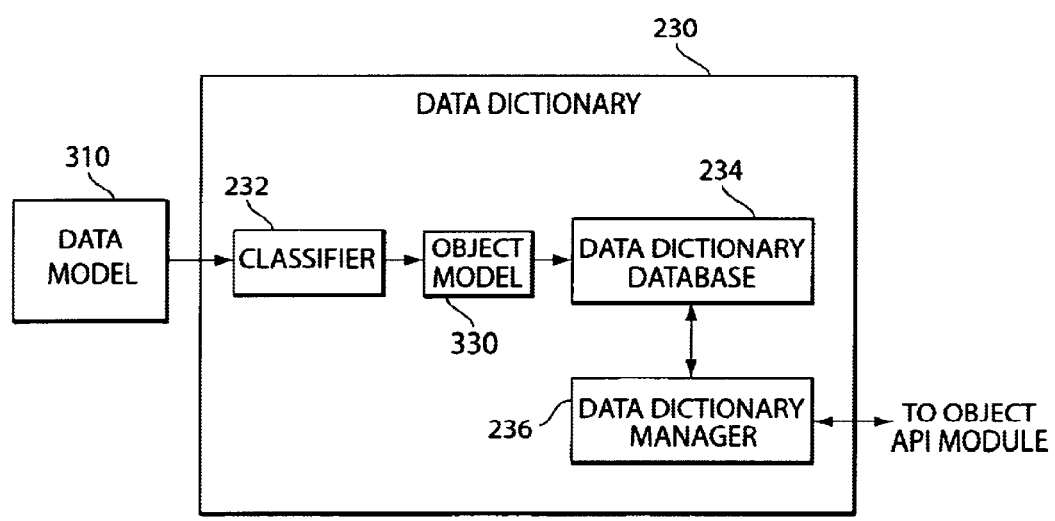
FIG. 3 is a schematic diagram of a module for creating a data model in accordance with an embodiment of the invention.

With reference to FIG. 3 in conjunction with FIG. 2, the object development module 210 creates a data dictionary 230 which defines the object models. FIG. 3 illustrates a process for creation of the data dictionary 230. The process includes a classifier 232, a data dictionary database 234 and a data dictionary manager 236. The data dictionary 230 is developed to represent the data for specified application data. Turning to the classifier 232, generally a data model 310 can be defined from a potentially infinite number of possible data formats. However, in accordance with the invention, these possible data formats can be classified as object models 330. The object models are based upon a finite number of basic data patterns recognized in the development platform 200. The classifier 232 performs this task by classifying a data model 310 into a set of object models 330 having the following basic data patterns:
  primitive;
  class; and
  object array.

A primitive represents a basic element. It can be data such as Boolean, Short, Integer, Long, Float, Double, Date, Time, Date & Time, Currency, Business Calendar, Alphanumeric Characters, Big Integer and so forth. A class represents structured data. It is composed of multiple attributes, each of which is also one of the basic data patterns. An object array is an array with a set of objects, all having the same basic data pattern, as its child elements. It should be noted that a characteristic of the class and object array types is their recursive nature. An attribute of a class or element of an object array can be another class or object array. This recursiveness of certain object types provide for creation of a complex data model from a finite set of basic data patterns.

Using the classification method described above, a finite number of possible data patterns used to define a data model 310 that can have a potentially infinite number of possible variations. Thus, only a finite number of data patterns in the object models 330 need to be interpreted. The classifier 232 can operate in various ways. It can be a program which receives information regarding the data model 310 corresponding to the application model 110 and automatically map the data model 310 to an appropriate set of object models 330. Alternatively, a programmer could simply use a text editor program to enter information defining the object models 330 in a format recognized by the system. Preferably, the development platform 200 includes an interactive program to aid a user in creating appropriate object models 330 for a data model 310.

Once properly classified, the object models 330 are stored in the data dictionary database 234. Again, the data dictionary database may take many forms. An example of the data dictionary database 234 with definitions for different object models 330 is provided in the appendix hereto. The object models 330 in the data dictionary database 234 must be uniquely identified so that they can be properly accessed. The unique identification can be done with a unique name or a unique identification number (ID) in the data dictionary database 234.

With the object models 330 stored in the data dictionary database 234, the object API module 220 can now be utilized to select and organize the various functions to be performed on the data of the object models 330.

Figure 4:
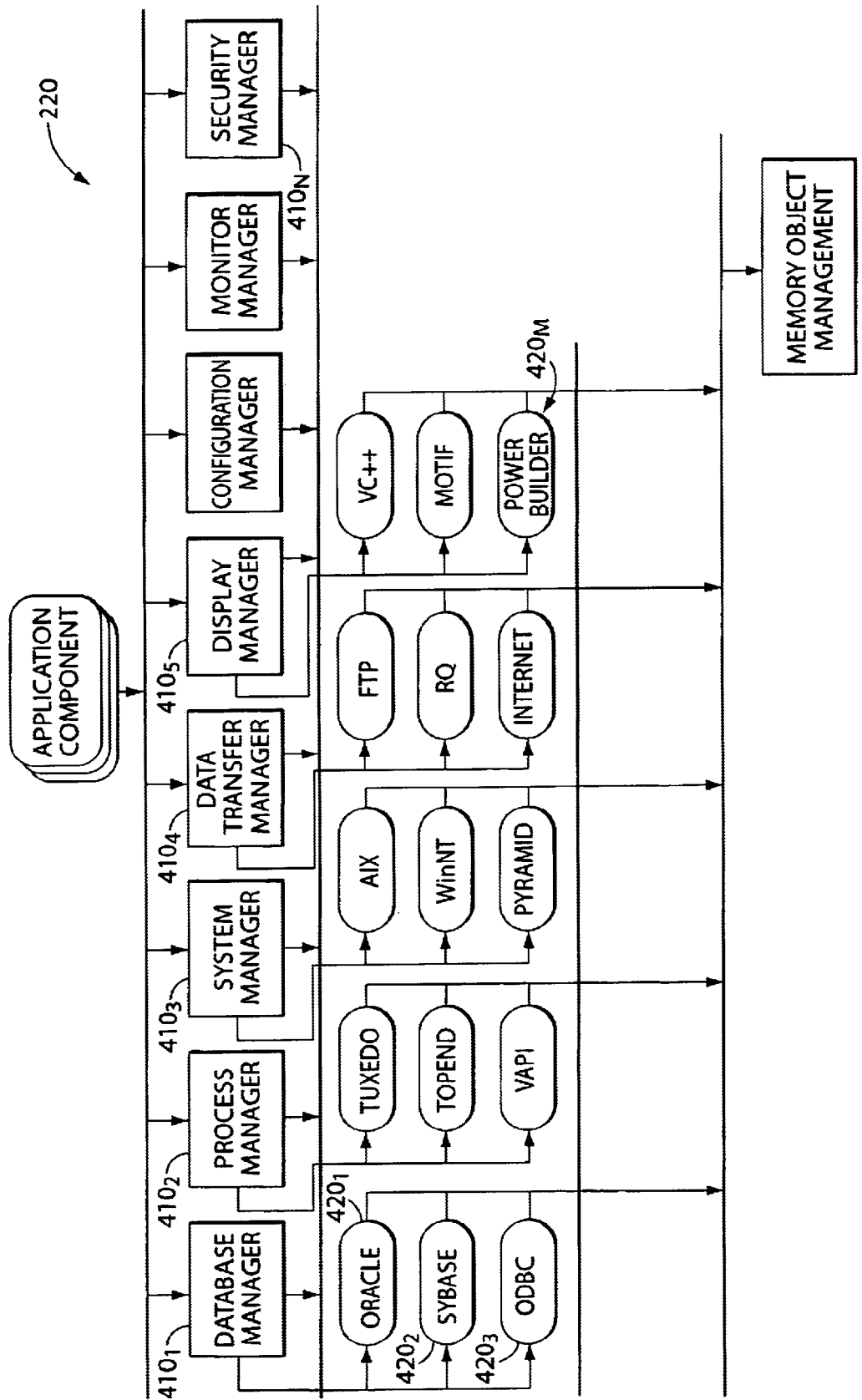
FIG. 4 is a schematic diagram of an object API module in accordance with an embodiment of the invention.

FIG. 4 illustrates service objects within the object API module 220. The service objects comprise device manager sub-modules $410_1$–$410_N$ that are functional/business blocks to perform a function or a process on data of the object models 330. Generally, the service objects of the object API module 220 are a collection of device managers $410_1$–$410_N$ that have adopted many system functions and third party APIs to build a layer of service objects $420_1$–$420_M$ that performs functions/services on the object models 330. Specifically, a finite number of services is identified for each resource or tool (e.g., graphic user interface (GUI), database, transport, transaction and etc.) and a service object $420_1$–$420_M$ is created for each service that a device manager $410_1$–$410_N$ is to provide. Each service object $420_1$–$420_M$ is designed to perform a particular service one of the object models 330.

One feature of the service object $420_1$–$420_M$ is that it performs a function/service on one or more object models 330 based on the pattern information of the object models 330 from the data dictionary database 234. During operation, prior to the performance of a service object, the object API module 220 calls the data dictionary manager 236, which manages all the object models 330 that are stored in the data dictionary database 234. The object API module 220 accesses the object models 330 in the data dictionary database 234 which are relevant to the operation of the service object to determine the data patterns of those object model 330. Once the determination is made, the object API module 220 passes the data patterns to the pertinent service object that is to perform the functional/service process. Because there are only a finite number of data patterns with which an object model 330 can be represented, a service object $420_1$–$420_M$ having a finite set of functions/services can be designed to address each possible data pattern of the object models 330. Therefore, once the data pattern of an object model 330 has been identified, a dispatching takes place within the service object $420_1$–$420_M$ to perform an appropriate function/service process for the data pattern of a particular object model 330. Since object models 330 can be defined recursively, the appropriate function/service process could also be recursive.

It should be noted that because the object model 330 is processed based on the identified pattern, a change in the object model 330 will be recognized by the object API module 220 at runtime when it interrogates the data dictionary database 234 via the data dictionary manager 236 and this information is passed to the service object $420_1$–$420_M$ prior to the service object's $420_1$–$420_M$ performance. The service object $420_1$–$420_M$ being informed of the changed pattern processes the object model 330 in accordance with the changed pattern. This feature is advantageous in that it allows the data model 310 (and thus, the separate object models 330) to be dynamically altered, which will be detected and the object models 330 are processed accordingly. Specifically, the service object $420_1$–$420_M$ performing processes on an object model 330 will recognize the current data patterns and dynamically alter its process to adapt to the modified object model 330. The features described above allows for the runtime reconfiguration of the data model 310 of the application model 110, which is advantageous over a previously known method that requires the program codes to be reprogrammed, linked, compiled and debugged whenever the data model 310 is modified.

Figure 5:
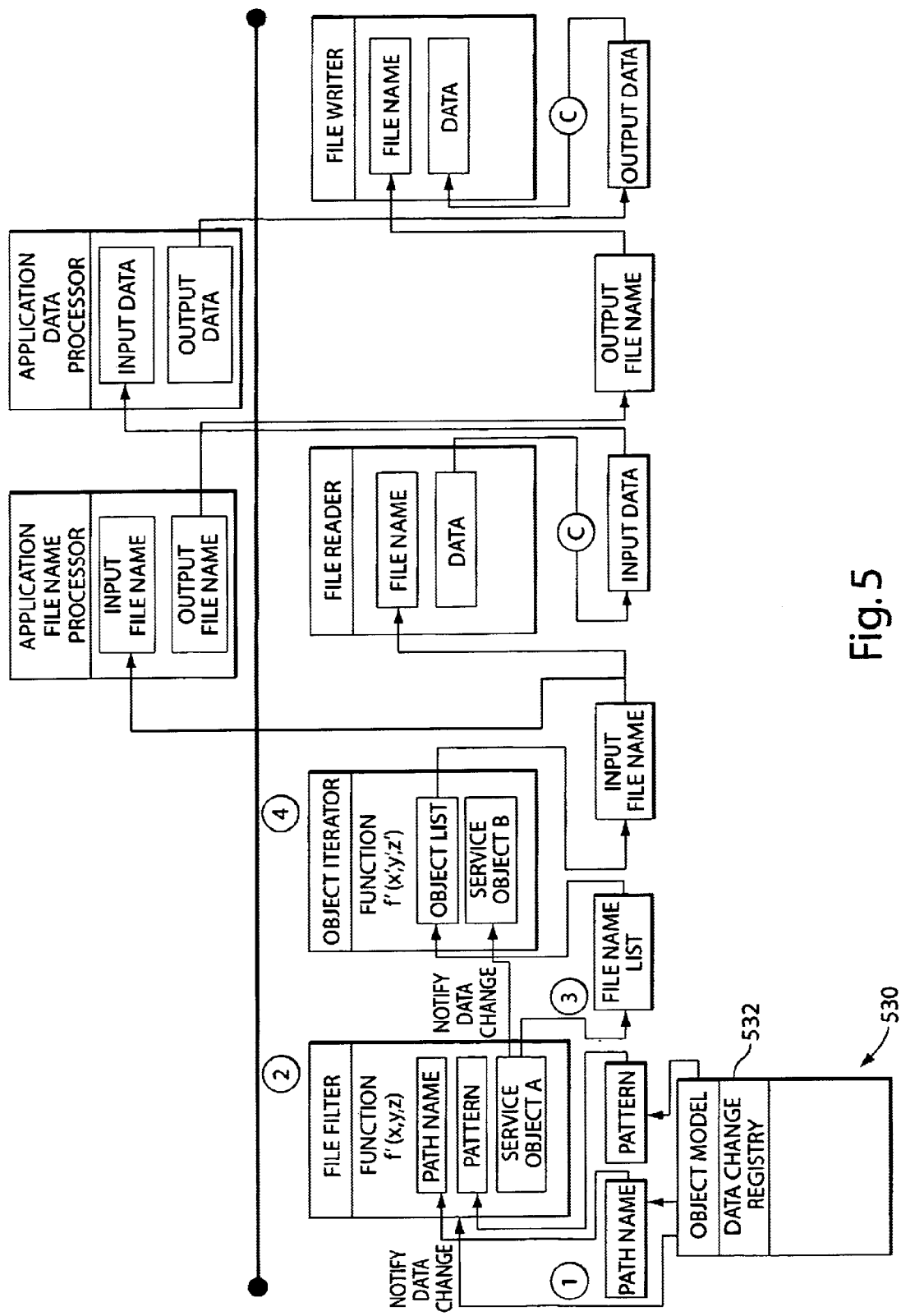
FIG. 5 illustrates an example of an event driven flow in accordance with an embodiment of the invention.

Another aspect of the invention is the event driven approach between the application model 110 and the service objects $420_1$–$420_M$, or program flow. Specifically, the data model 310 (in object model 330 form) and associated service objects $420_1$–$420_M$ are configured based on flow to link services, where various utility functions (business functions) that are performed on the object model 330 are event driven by data change and/or event and not code driven as in previously known programming approaches. According to one aspect of the invention, the object models 330 and service objects $420_1$–$420_M$ are linked such that one or more data changes in an object model 330 causes specified service objects $420_1$–$420_M$ to be notified of the data changes. With reference to FIG. 5, the object model 530 may include a data change registry 532 that provides for any service object (such as service object A) to register for notification on various data changes. When a data change occurs at the object model 530, the registered service object (service object A) is notified and the service object determines if the data change is a change that requires processing. If the service object so determines then the service object performs a process based on the data change. According to the aspect of the invention, the object model notifies the relevant service objects of the data change but does not actively cause the service objects to perform a process due to the data change. Instead, the service object makes that determination upon receiving notification. Additionally, a process performed by the service object may also cause a data change that affects other service objects (such as service object B). In this instance, the service object may be configured to trigger a notification to other service objects upon execution or completion.

Continuing with FIG. 5, a flow process of an event driven approach is illustrated in accordance with the invention. At stage 1, a data change has occurred in the object model 530. The object model 530 accesses the data change registry 532 to determine which service objects should be notified of the data change (the service objects have previously registered for notification of the various data changes). Once the determination is made, the object model 530 notifies the pertinent service objects of the data change. At stage 2, service object A receives notification that a data change has occurred. The service object A determines whether the data change requires performance of a process and if so, service object A performs the process. At stage 3, the service object A outputs the result of the process which may have caused further data change in the object model and may affect other service objects. In one embodiment, the object model A reviews its data change registry to determine if the data change requires notification to other service objects. In this instance, the service object A determines that service object B requires notification and notifies service object B of the data change. At stage 4, the service object B receives a notification from service object A and determines whether the data change is of the type that requires processing. If so, the function B block performs the required process and outputs the result of the process. This flow process may be repeated for other service objects until the flow process triggered by the data change has been satisfied.

Turning back to FIG. 2, the object API Module 220 interface bridges with the specific APIs of the resources and tools of the third party. In accordance with one embodiment, the classification method (e.g., primitive, class, object array) that sets the finite set of object models of data models is iterated against the third party APIs to determine which object models are recognized by the third party APIs. For instance, the classification method is iterated against a transport tool JMS, wherein a list of object models that are recognized by the JMS is compiled and device drivers based on the object models are built and stored within the object API module. Thus, when an object model of a data model is to be interfaced with JMS, the object API module determines which device driver can be used to allow the object model to be interfaced. Alternatively, the object models that allow for the interface with JMS, for example, may be stored in the object API module and when an object model of a data model is to be interfaced with JMS, the classifier begins an iteration process on the object model that transforms the object model pattern into one recognized by the JMS. The transformed model is then interfaced with JMS.

According to one aspect of the invention, for each service object, a fixed pattern of input and output parameters can be defined so that all the service objects have uniform APIs, thereby significantly simplifying the programming logic.

According to various aspects of the invention, a programming tool may take a data model of the application model and perform an iterative process using classification of primitive, class and object array to define a pattern that describes the data model, which is stored in the data dictionary as an object model. A complete change in the data model may require the re-use of the programming tool to define an object model; however certain alterations and modifications may be performed by a data dictionary Editor that implements the changes during the runtime. Because there are finite services available in the object API module, the service objects may be displayed in templates of a GUI that are dragged and dropped into programs during creation of the application module. In one embodiment, the language that is used to construct an application model may be Extensible Markup Language (XML) but other languages may be used to construct the application model.

The present invention is not limited to a development platform which operates as described above. Rather, any development process can be used within the meaning of the present invention which creates a set of object models for representing data and a set of service objects for performing functions with respect to the object models.

Embodiments of the invention provides various benefits such as reduced programming time, reduced programming code size and programming may be performed by less specialized programmers. Having thus far described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. Accordingly, the invention is defined by the following claims and equivalents thereof.

What is claimed is:

1. A method for creating application software comprising the steps of:

storing a first set of object models representing data of an application, each object model corresponding to a set of elements, wherein the elements are selected from a finite set of basic object types;

selecting a subset of service objects from a stored set of service objects, wherein the service objects are independent of the object models and wherein each of the service objects includes functionality to parse at least one object model to determine elements and basic object types in the at least one object model and functionality to perform a function with respect to elements of each of the basic object types; and defining a flow process representing an order for operation of the selected subset of service objects and data of the application.

2. The method of claim 1, wherein the basic object types include:

a primitive, a class, and an object array.

3. The method according to claim 2, wherein the class object type includes a plurality of attributes, each of which is a basic object type.

4. The method according to claim 2, wherein the object array object type includes a plurality of elements, each of the plurality of elements being of a single basic object type.

5. The method according to claim 1, wherein at least one of the service objects provides functions with respect to an identified device driver for a resource.

6. The method according to claim 1, further comprising the step of creating and storing a set of service objects.

7. The method according to claim 6, wherein the creating and storing step includes creating at least one service object which performs different functions depending upon a basic data type of at least one of the object models.

8. A system for creating application software comprising:

means for storing a first set of object models representing data of an application, each object model corresponding to a set of elements, wherein the elements are selected from a finite set of basic object types;

a stored set of service objects wherein the service objects are independent of the object models and wherein each of the service objects includes functionality to parse at least one object model to determine elements and basic object types in the at least one object model and functionality to perform a function with respect to elements of each of the basic object types; and means for selecting a subset of the stored set of service objects; and means for defining a flow process representing an order for operation of the subset of service objects and data of the application.

9. The system according to claim 8, wherein the means for storing includes:

means for receiving an application model representing data in the application software;

means for classifying each data element in the application model as an object model; and means for storing each object model from the classifying means.

10. The system according to claim 8, wherein at least one of the service objects can provide an interface function with at least one resource.

* * * * *